United States Patent
Park et al.

(10) Patent No.: US 7,209,198 B2
(45) Date of Patent: Apr. 24, 2007

(54) COLOR FILTER ARRAY SUBSTRATE AND FABRICATING METHOD THEREOF

(75) Inventors: Jong Jin Park, Gyeonggi-do (KR); Heum Il Baek, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 124 days.

(21) Appl. No.: 10/995,241

(22) Filed: Nov. 24, 2004

(65) Prior Publication Data

US 2005/0117092 A1   Jun. 2, 2005

(30) Foreign Application Priority Data

Nov. 27, 2003 (KR) .............. 10-2003-0085130
Dec. 23, 2003 (KR) .............. 10-2003-0095660

(51) Int. Cl.
*G02F 1/1335* (2006.01)

(52) U.S. Cl. ............ 349/106; 349/110; 349/122; 349/155; 349/187

(58) Field of Classification Search ........ 349/106, 349/108, 110, 111, 122, 138, 155, 156, 187; 359/891; 430/7, 20, 321; 428/1.1, 1.3; 345/88
See application file for complete search history.

(56) References Cited

U.S. PATENT DOCUMENTS

| | | | |
|---|---|---|---|
| 5,969,784 A | 10/1999 | Miyazaki et al. | 349/155 |
| 6,989,876 B2 * | 1/2006 | Song et al. | 349/109 |
| 2001/0019382 A1 | 9/2001 | Song et al. | |
| 2002/0140893 A1 | 10/2002 | Yi et al. | 349/155 |
| 2004/0125322 A1 * | 7/2004 | Sawasaki | 349/156 |
| 2004/0135937 A1 * | 7/2004 | Lee et al. | 349/106 |
| 2004/0169807 A1 | 9/2004 | Rho et al. | |
| 2004/0179160 A1 | 9/2004 | Rhee et al. | |

FOREIGN PATENT DOCUMENTS

| | | |
|---|---|---|
| JP | 05-088011 | 4/1993 |
| JP | 11-295717 | 10/1999 |
| KR | 1020030057208 A | 7/2003 |
| WO | WO 00/70392 | 11/2000 |

* cited by examiner

*Primary Examiner*—Toan Ton
*Assistant Examiner*—Tai Duong
(74) *Attorney, Agent, or Firm*—Morgan, Lewis & Bockius LLP

(57) ABSTRACT

A color filter array substrate includes a black matrix on a substrate, a plurality of color filters at an area separated by the black matrix, the color filters including red, green, blue and white color filters, a height of the white color filter being different from a height of the red, green and blue color filters, and a spacer at an area that overlaps the black matrix.

18 Claims, 30 Drawing Sheets

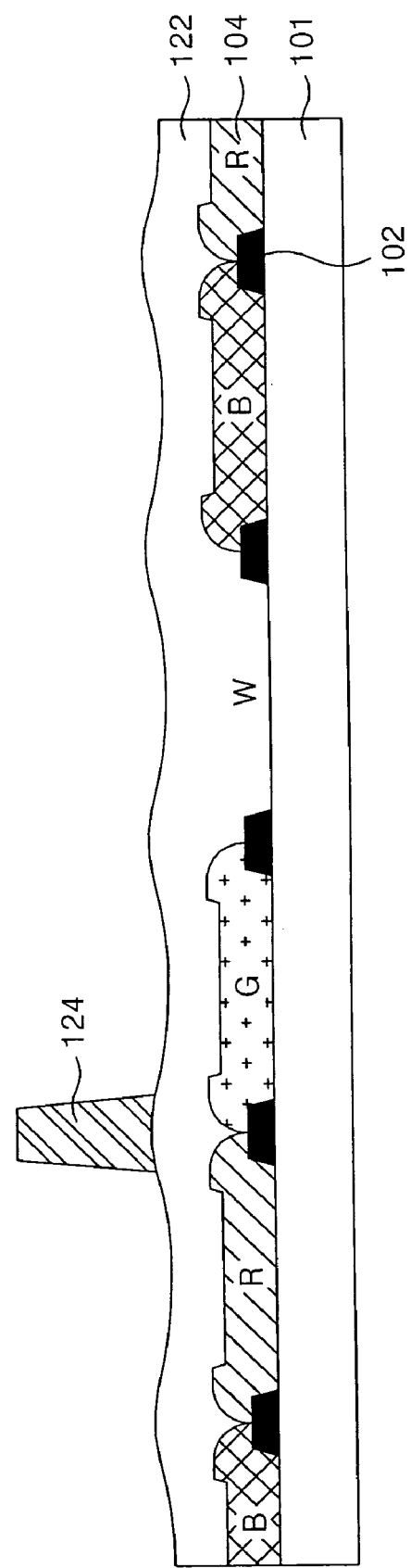

COLOR FILTER ARRAY SUBSTRATE AND FABRICATING METHOD THEREOF

The present application claims the benefit of Korean Patent Application No. P2003-85130 filed in Korea on Nov. 27, 2003 and Korean Patent Application No. P2003-95660 filed in Korea on Dec. 23, 2003, which are hereby incorporated by reference.

BACKGROUND OF THE INVENTION

1. Field of the Invention

The present invention relates to a liquid crystal display device, and more particularly to a color filter array substrate and a fabricating method thereof.

2. Discussion of the Related Art

In general, liquid crystal display (LCD) devices use optical anisotropy and polarization properties of liquid crystal molecules to generate a desired image. In particular, liquid crystal molecules can be aligned in a specific orientation, which can be controlled by applying an electric field across the liquid crystal molecules. The liquid crystal display generally includes a liquid crystal display panel having liquid crystal cells arranged in a matrix-like manner and a driving circuit for driving the liquid crystal display panel.

In addition, the liquid crystal display panel also includes pixel electrodes for applying electric field to each of the liquid crystal cells and a reference electrode, i.e., a common electrode. Generally, the pixel electrode is formed on a thin film transistor (TFT) array substrate in the liquid crystal cells, and the common electrode is formed on another substrate, i.e., a color filter array substrate. Each of the pixel electrodes is connected to a TFT. Thus, the pixel electrodes along with the common electrode drive the liquid crystal cells to transmit light in accordance with a data signal supplied through the TFTs.

FIG. 1 is a perspective view illustrating a liquid crystal display panel according to the related art. In FIG. 1, a liquid crystal display panel includes a color filter array substrate 10 and a TFT array substrate 20 with a liquid crystal layer 8 formed therebetween. The color filter array 10 includes a black matrix 2, a color filter 4 and a common electrode 6. The color filter 4 includes color filters of red R, green G and blue B to transmit light of specific wavelength ranges, thereby displaying color lights. A black matrix 2 is formed between adjacent color filters 4 to absorb the light incident from the adjacent cells, thereby preventing a color contrast from being deteriorated.

The TFT array substrate 20 includes data lines 18 and gate lines 12 intersecting each other, thereby defining a plurality of cell areas. A gate insulating film (not shown) is formed between the data lines 18 and the gate lines 12. A TFT 16 is formed at each intersection between the data lines 18 and gate lines 12. In particular, the TFT 16 includes a gate electrode connected to a respective one of the gate lines 12, a source electrode connected to a respective one of the data lines 18, and a drain electrode facing the source electrode with a channel part that includes an active layer and an ohmic contact layer. The TFT 16 is electrically connected to the pixel electrode 14, such that the TFT 16 responds to a gate signal from the respective gate line 12 to selectively supply the data signal from the respective data line 18 to the pixel electrode 14.

The pixel electrode 14 is located at each of the cell areas and includes a transparent conductive material having high light transmissivity. The pixel electrode 14 generates a potential difference with the common electrode 6 by the data signal supplied through the drain electrode of the TFT 16. The potential difference causes the liquid crystal layer 8 to rotate by dielectric constant anisotropy. Accordingly, the light incident on the liquid crystal panel from a light source (not shown) is transmitted in accordance with the data signal.

Each pixel includes three sub-pixels realizing red color R, green color G, and blue color B. However, poor brightness is generated by these R, G, B sub-pixels because the amount of light being transmitted to the upper substrate 1 through the color filter 4 generally is only about 27~33% of the amount of light generated by a backlight. In order to solve this problem, a color filter array substrate of a liquid crystal display panel shown in FIG. 2 has been proposed.

FIG. 2 is a cross-sectional view illustrating a color filter array substrate having a white color filter according to the related art. As shown in FIG. 2, a color filter array substrate includes a pixel having four sub-pixels realizing red color R, green color G, blue color B and white color W. In particular, the amount of light being transmitted through the W sub-pixel generally is not less than 85% of the amount of light generated by the backlight unit. Accordingly, the overall amount of light being transmitted through the R, G, B, W sub-pixels is higher, thereby improving brightness of the liquid crystal display panel.

FIGS. 3A to 3G are cross-sectional views illustrating a fabricating method of the color filter array substrate shown in FIG. 2. As shown in FIG. 3A, an opaque material is deposited on the entire surface of the upper substrate 1. The opaque material includes opaque metal or opaque resin, e.g., chrome (Cr). The opaque material then is patterned by a photolithography process and an etching process using a first mask (not shown) to form a black matrix 2.

As shown in FIG. 3B, a red resin is deposited on the entire surface of the upper substrate 1 over the black matrix 2. The red resin then is patterned by the photolithography process using a second mask (not shown) to form a red color filter 4R. In addition, as shown in FIG. 3C, a green resin is deposited on the entire surface of the upper substrate 1 over the black matrix 2 and the red color filter 4R. The green resin then is patterned by the photolithography process using a third mask (not shown) to form a green color filter 4G. Further, as shown in FIG. 3D, a blue resin is deposited on the entire surface of the upper substrate 1 over the black matrix 2, the red color filter 4R and the green color filter 4G. The blue resin then is patterned by the photolithography process using a fourth mask (not shown) to form a blue color filter 4B.

Then, as shown in FIG. 3E, a white resin is deposited on the entire surface of the upper substrate 1 over the black matrix 2, the red color filter 4R, the green color filter 4G and the blue color filter 4B. The white resin includes acrylic resin. The white resin then is patterned by the photolithography using a fifth mask (not shown) to form a white color filter 4W.

Further, as shown in FIG. 3F, an organic insulating material including the same material as the white resin is deposited on the entire surface of the upper substrate 1 over the black matrix 2, the red color filter 4R, the green color filter 4G, the blue color filter 4B and the white color filter 4W. The organic insulating material then is patterned by the photolithography process using a sixth mask (not shown) to form an overcoat layer 22.

Moreover, an organic insulating material including the same material as the overcoat layer 22 is deposited on the entire surface of the upper substrate 1 over the black matrix 2, the red color filter 4R, the green color filter 4G, the blue color filter 4B, the white color filter 4W and the overcoat layer 22. The organic insulating material then is patterned by the photolithography process using a seventh mask (not shown) to form a spacer 24.

Thus, the fabricating method of the color filter substrate for the LCD device according to the related art requires at least seven mask processes or photolithography processes to form the color filter substrate including the black matrix, the red, green, blue and white color filters, the overcoat layer and the patterned spacer. Since a mask used in each of the mask processes is very expensive, a production cost is increased and a fabricating process is complicated, thereby reducing production efficiency.

SUMMARY OF THE INVENTION

Accordingly, the present invention is directed to a color filter array substrate and the fabrication method thereof that substantially obviate one or more of the problems due to limitations and disadvantages of the related art.

An object of the present invention is to provide a color filter array substrate and a fabricating method thereof that have a simplified process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a color filter array substrate includes a black matrix on a substrate, a plurality of color filters at an area separated by the black matrix, the color filters including red, green, blue and white color filters, a height of the white color filter being different from a height of the red, green and blue color filters, and a spacer at an area that overlaps the black matrix.

In another aspect, a fabricating method of a color filter array substrate includes forming a black matrix on a substrate, and forming red, green, blue and white color filters at an area separated by the black matrix, a height of the white color filter being different from a height of the red, green and blue color filters.

In yet another aspect, a fabricating method of a color filter array substrate includes forming a black matrix on a substrate, forming red, green, blue and white color filters at an area separated by the black matrix, and forming an overcoat layer over at least the red, green, and blue color filters, the overcoat layer being formed at the same time as the forming of the white color filter or before the forming of the white color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 11 is a planar view illustrate a color filter array substrate for a liquid crystal display panel according to another embodiment of the present invention;

DETAILED DESCRIPTION OF THE PREFERRED EMBODIMENTS

Reference will now be made in detail to the preferred embodiments, examples of which are illustrated in the accompanying drawings.

Figure 1:
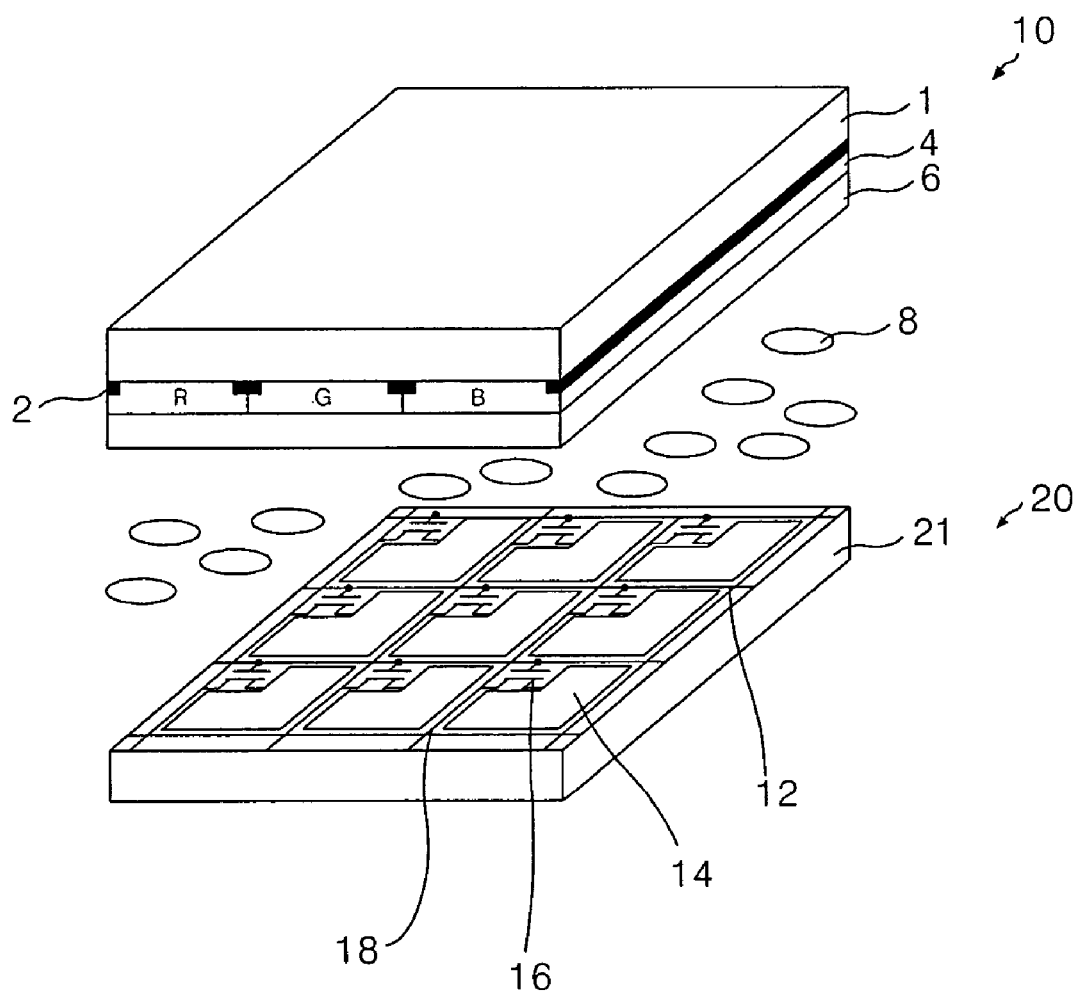
FIG. 1 is a perspective view illustrating a liquid crystal display panel according to the related art.
Figure 2:
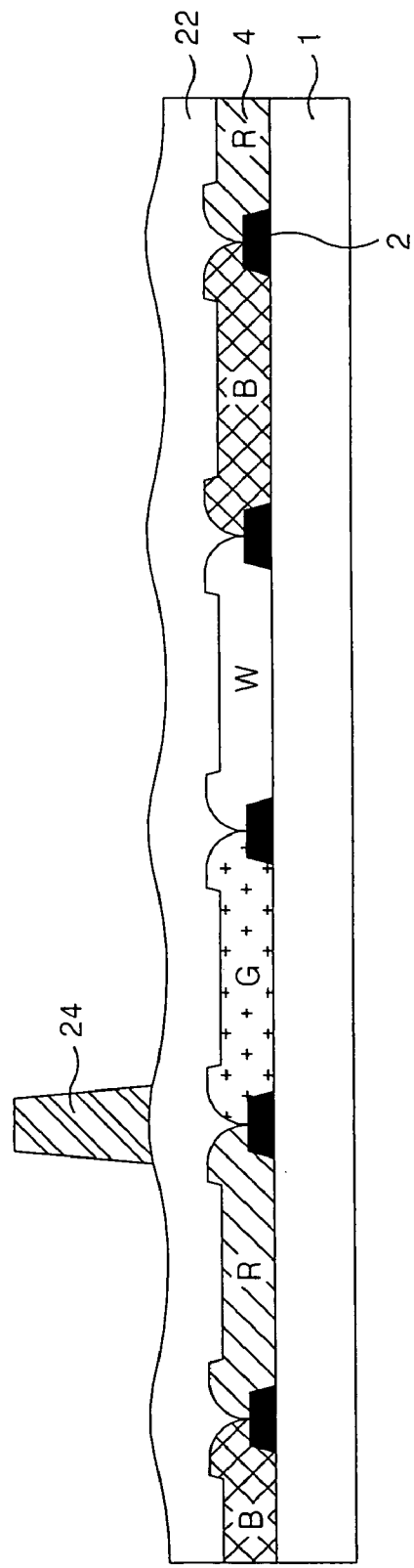
FIG. 2 is a cross-sectional view illustrating a color filter array substrate having a white color filter according to the related art.
Figure 3A:
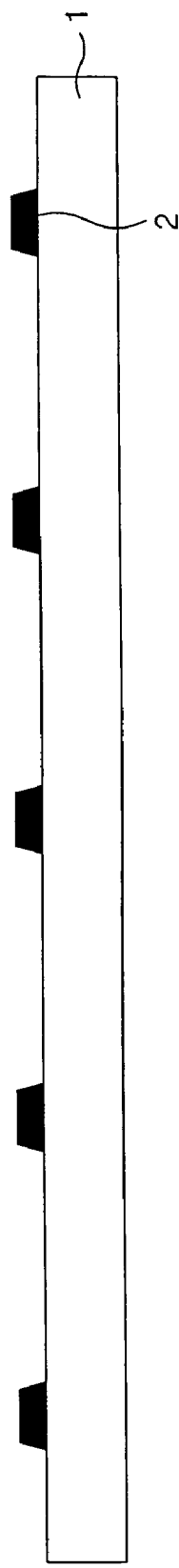
FIGS. 3A to 3G are cross-sectional views illustrating a fabricating method of the color filter array substrate shown in FIG. 2.
Figure 3B:
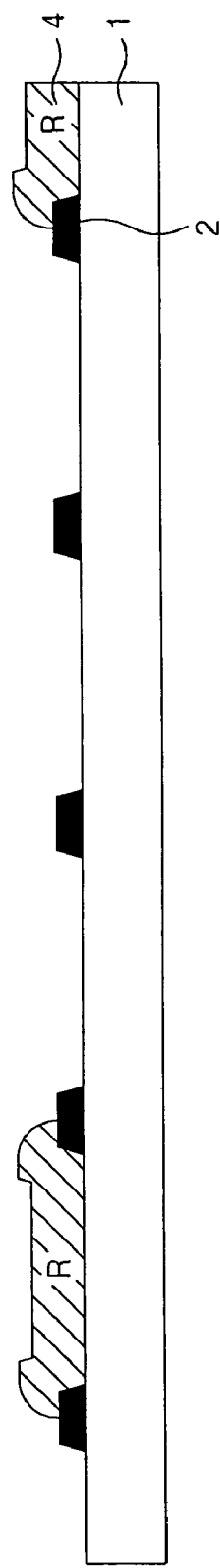
Figure 3C:
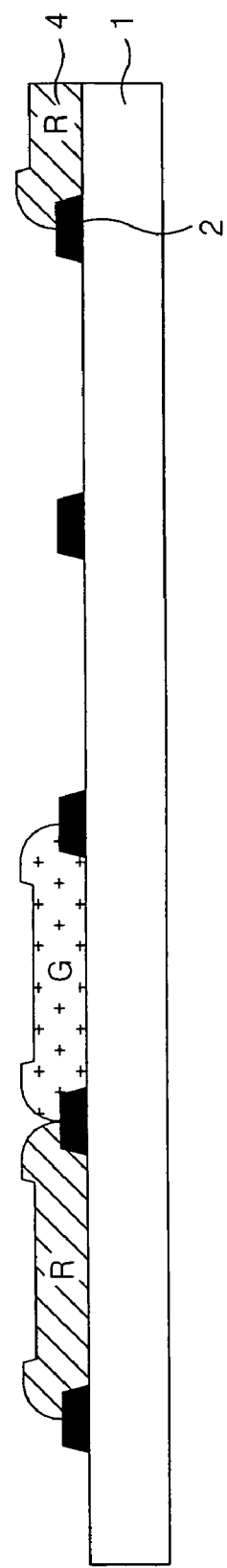
Figure 3D:
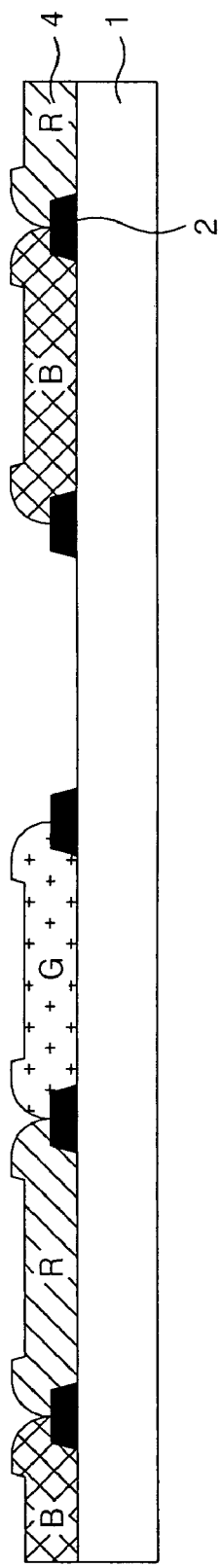
Figure 3E:
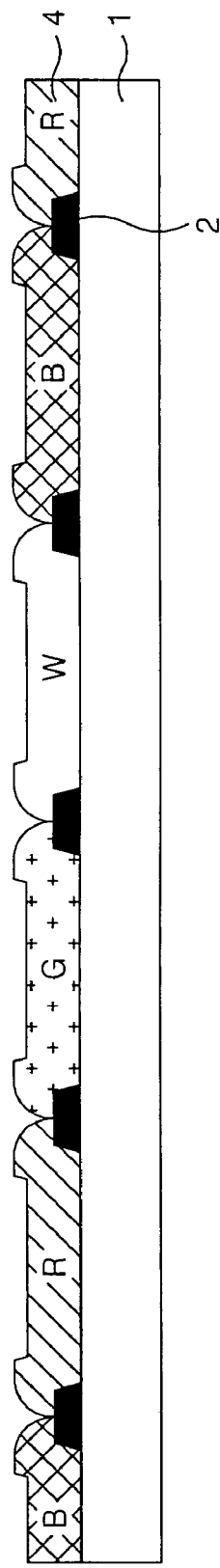
Figure 3F:
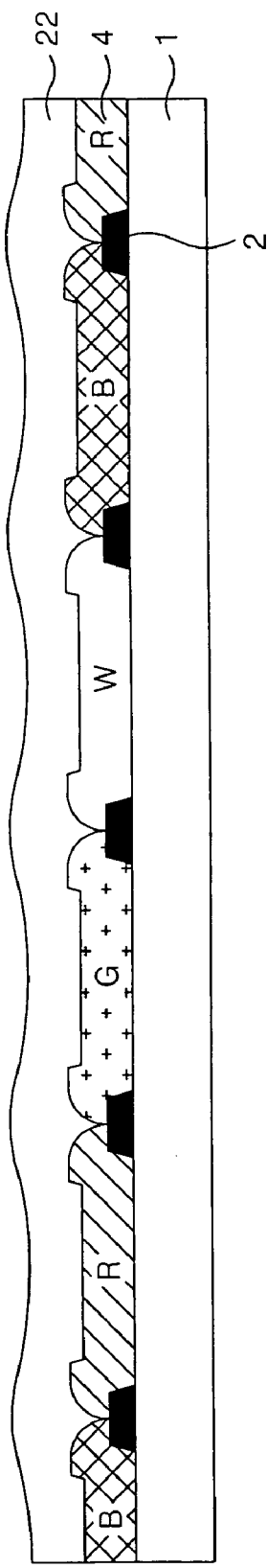
Figure 3G:
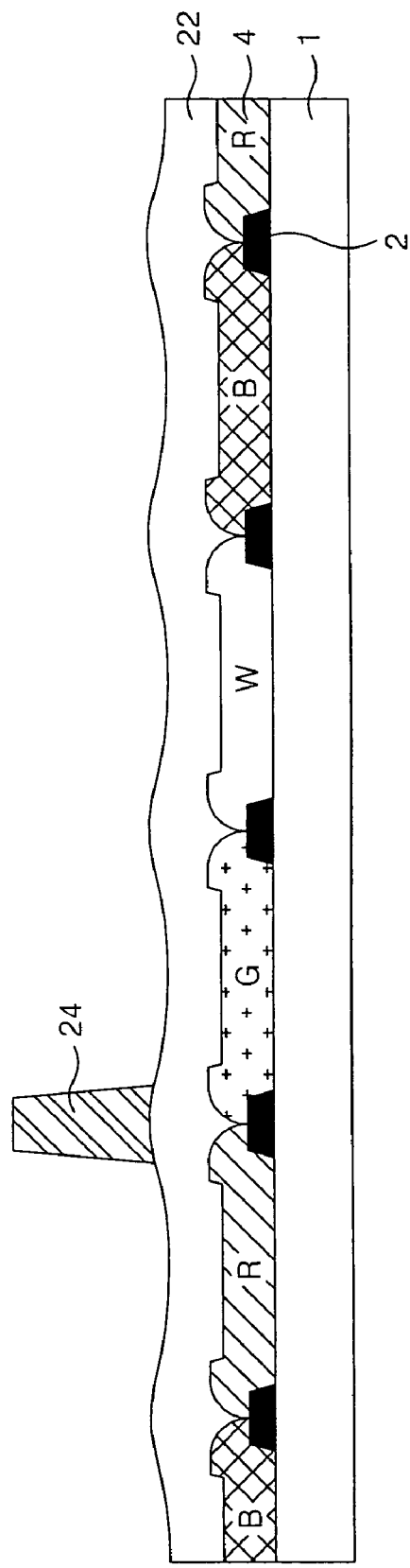
Figure 4:
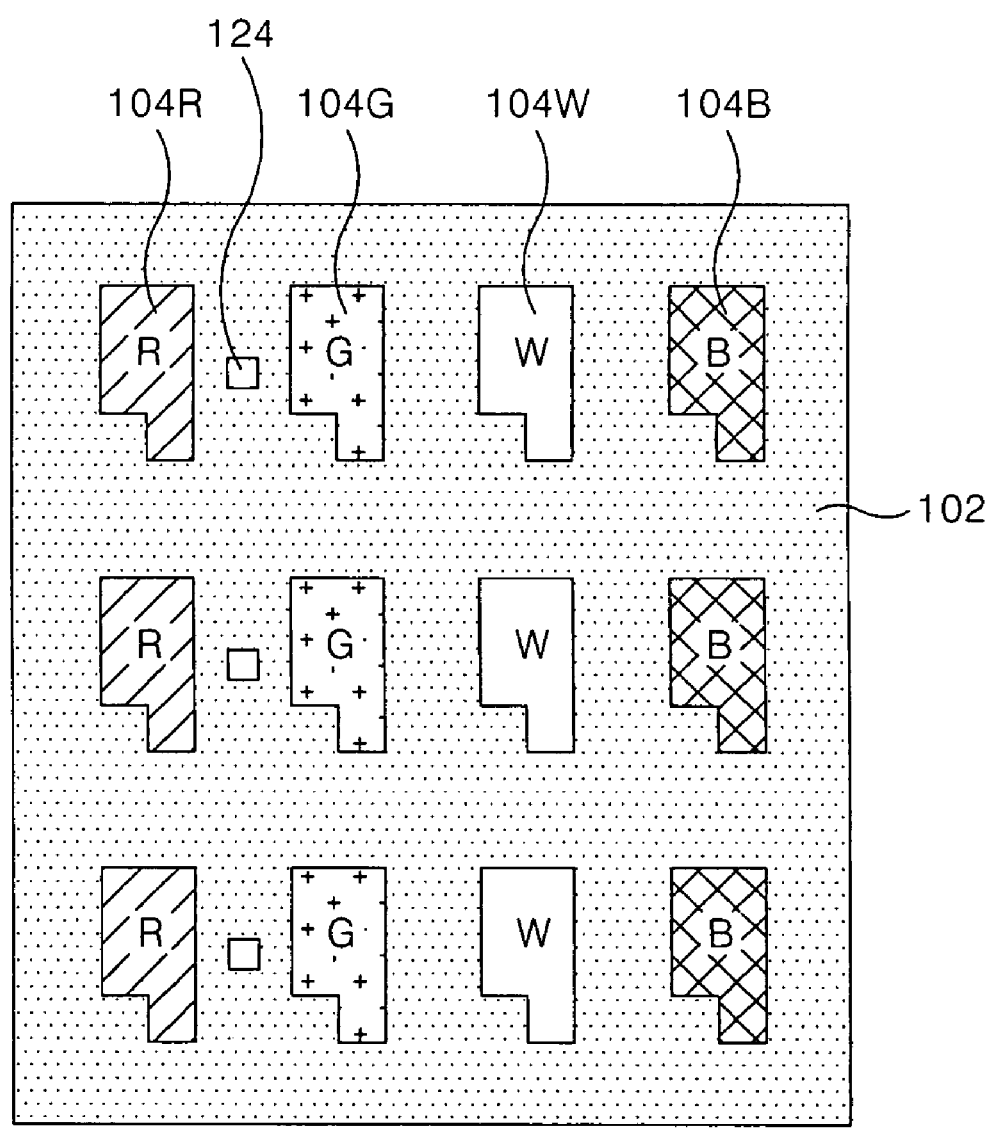
FIG. 4 is a planar view illustrating a color filter array substrate for a liquid crystal display panel according to an embodiment of the present invention.
Figure 5:
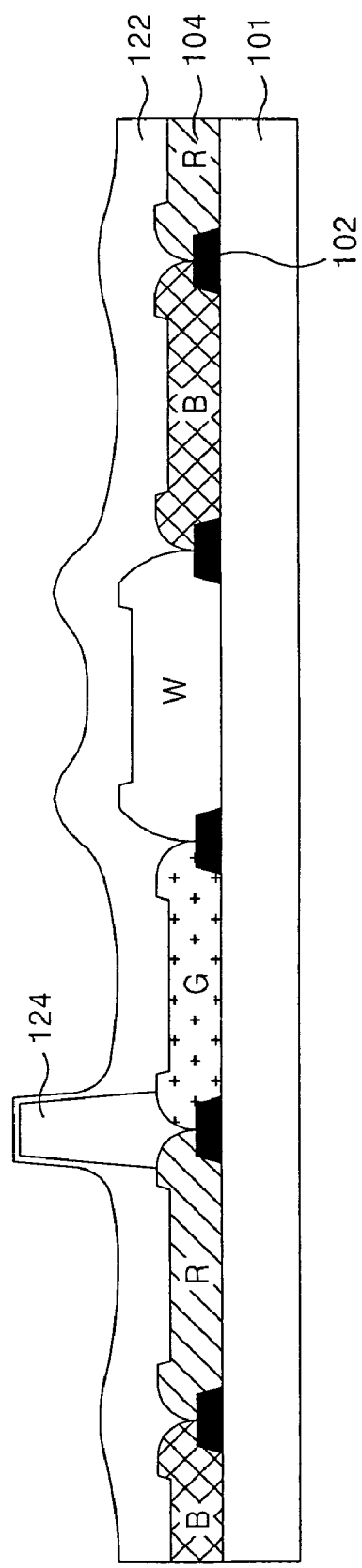
FIG. 5 is a cross-sectional diagram illustrating a color filter array substrate for a liquid crystal display panel according to another embodiment of the present invention.

FIG. 4 is a planar view illustrating a color filter array substrate for a liquid crystal display panel according to an embodiment of the present invention, and FIG. 5 is a cross-sectional diagram illustrating a color filter array substrate for a liquid crystal display panel according to another embodiment of the present invention. In FIG. 4, a color filter array substrate for a liquid crystal display panel includes a black matrix 102, a plurality of color filters 104R, 104G, 104B and 104W, and a spacer 124 formed on a substrate 101. The color filters 104R, 104G, 104B and 104W are formed in a matrix corresponding to a plurality of cell areas of the liquid crystal display panel. The color filters 104R, 104G, 104B and 104W may respectively correspond to red, green, blue and white color filters.

In addition, the black matrix 102 is around the color filters 104R, 104G, 104B and 104W to prevent light interference from occurring between adjacent cells. In particular, as shown in FIG. 5, a portion of the color filters 104R, 104G, 104B and 104W may overlap the black matrix 102 and the color filters 104R, 104G, 104B and 104W may contact one another. Although not shown, the black matrix 102 may overlap an area except a pixel electrode of a corresponding TFT array substrate. For instance, the black matrix 102 may overlap a gate line, a data line and a thin film transistor of the TFT array substrate.

Further, as shown in FIG. 5, a spacer 124 and an overcoat layer 122 are formed on the substrate 101. In particular, the spacer 124 may be formed simultaneously as the white color filter 104W, and an overcoat layer 122 formed on the substrate 101 covering the spacer 124 and the color filters 104R, 104G, 104B and 104W. In addition, the white color filter 104W may have a height larger than the height of the red, green and blue color filters 104R, 104G and 104B. As a result, the white color filter 104W and the spacer 124 may have the same height and may include the same material that does not affect the transmissivity of the white color filter 104W.

The spacer 124 functions to maintain a cell gap between the color filter array substrate and the corresponding TFT array substrate. The spacer 124 is formed to overlap the black matrix 102. The spacer 124 may have various cross-sectional shapes, e.g., circular, rectangular and triangular or the like. Further, the spacer 124 may be columnar, concave, trapezoidal or the like.

The overcoat layer 122 includes an organic insulating material and may provide a more flat surface for the substrate 101. In particular, since the white color filter 104W occupies about ¼ of the entire substrate area and the red, green and blue color filters 104R, 104G and 104B occupy about ¾ of the substrate area, it is easy to fill an area where the red, green and blue color filters 104R, 104G, 104B are formed, i.e., an area with low height, when the organic insulating material is coated as the overcoat layer 122.

As a result, the color filter array substrate of the liquid crystal display panel according to an embodiment of the present invention includes the white color filter 104W and the spacer 124 simultaneously formed of the same material. Accordingly, the number of mask processes is reduced without deteriorating the transmissivity of the white color filter 104W.

Figure 6A:
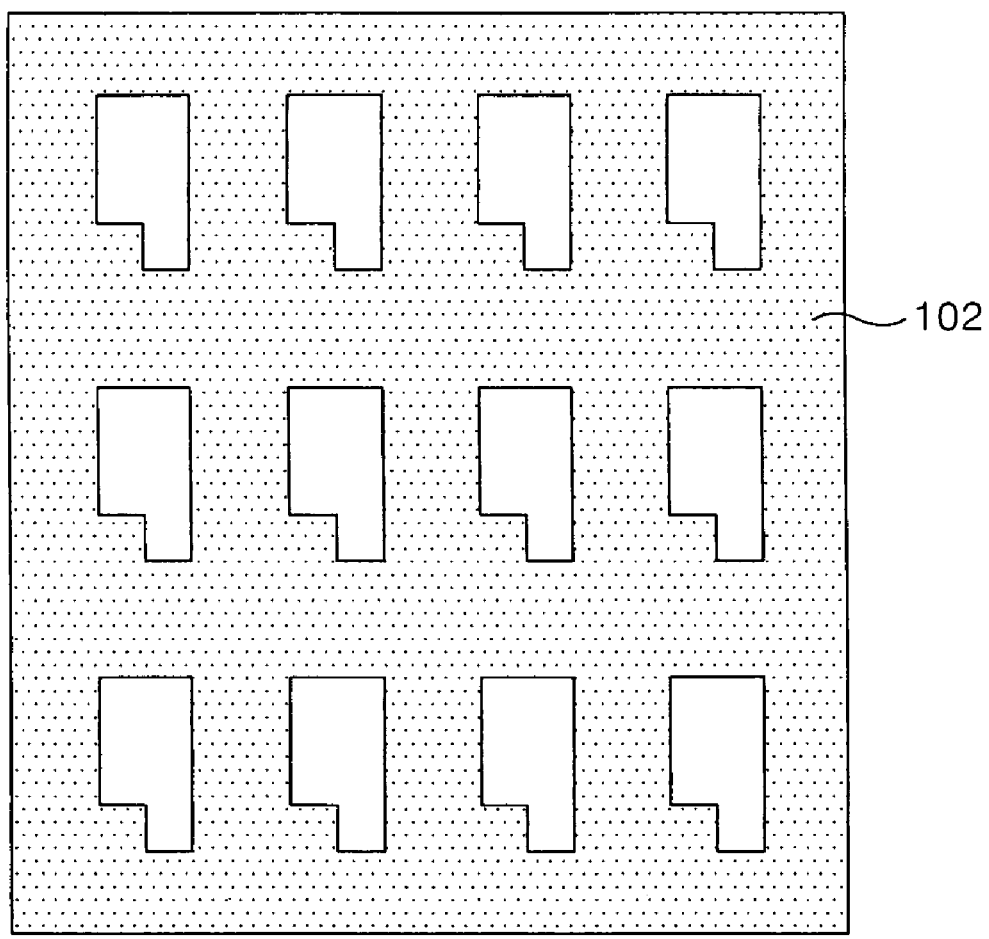
FIGS. 6A and 6B respectively are a plan view and a cross-sectional view illustrating a first mask process of a fabricating method of a color array substrate according to an embodiment of the present invention.
Figure 6B:
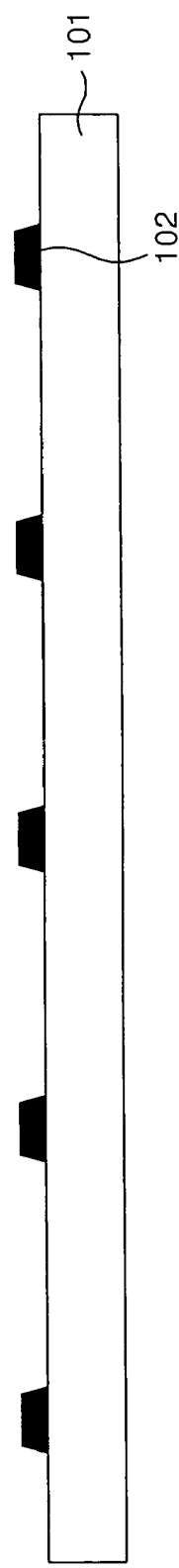

FIGS. 6A and 6B respectively are a plan view and a cross-sectional view illustrating a first mask process of a fabricating method of a color array substrate according to an embodiment of the present invention. In FIGS. 6A and 6B, an opaque material may be deposited on the entire surface of the substrate 101. The opaque material may include an opaque resin or an opaque metal, e.g., chrome (Cr). Subsequently, the opaque material is patterned by a photolithography process using a first mask (not shown) to form a black matrix 102. An etching process may be needed if the opaque material includes an opaque metal.

Figure 7A:
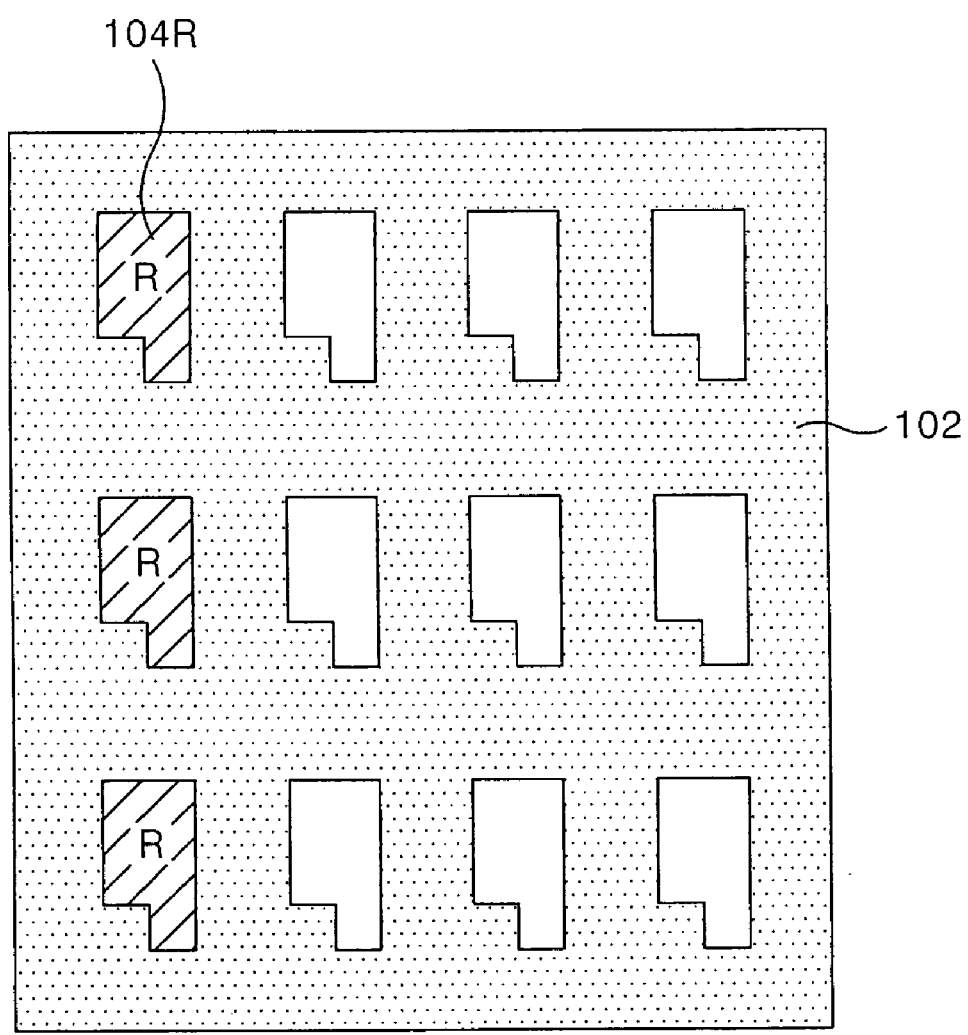
FIGS. 7A and 7B respectively are a planar view and a cross-sectional view illustrating a second mask process following the fabricating method of the color array substrate shown in FIGS. 6A and 6B.
Figure 7B:
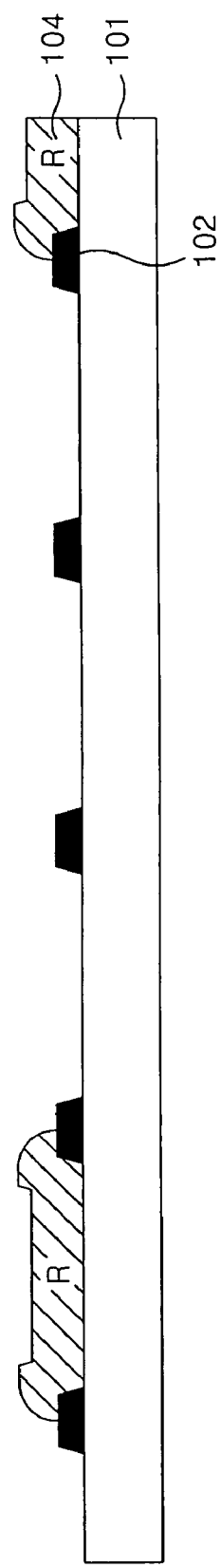

FIGS. 7A and 7B respectively are a planar view and a cross-sectional view illustrating a second mask process following the fabricating method of the color array substrate shown in FIGS. 6A and 6B. As shown in FIGS. 7A and 7B, a red resin may be deposited on the entire surface of the substrate 101 above the black matrix 102. The red resin then is patterned by the photolithography process using a second mask (not shown) to form a red color filter 104R.

Figure 8A:
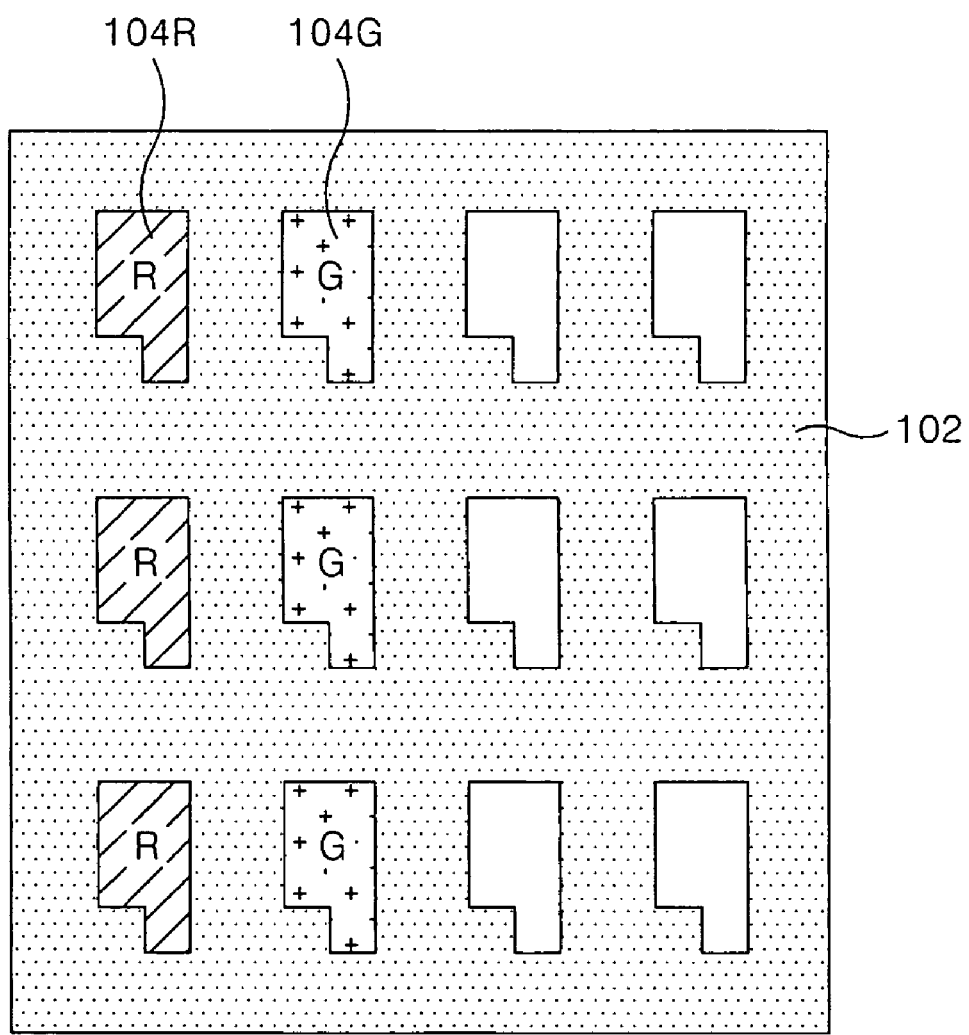
FIGS. 8A and 8B respectively are a planar view and a cross-sectional view illustrating a third mask process following the fabricating method of the color array substrate shown in FIGS. 7A and 7B.
Figure 8B:
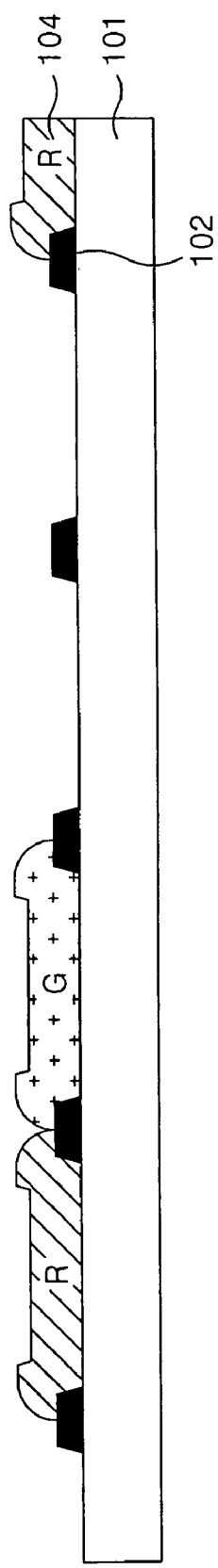

FIGS. 8A and 8B respectively are a planar view and a cross-sectional view illustrating a third mask process following the fabricating method of the color array substrate shown in FIGS. 7A and 7B. In FIGS. 8A and 8B, a green resin may be deposited on the entire surface of the substrate 101 above the black matrix 102 and the red color filter 104R. The green resin then is patterned by the photolithography process using a third mask (not shown) to form a green color filter 104G.

Figure 9A:
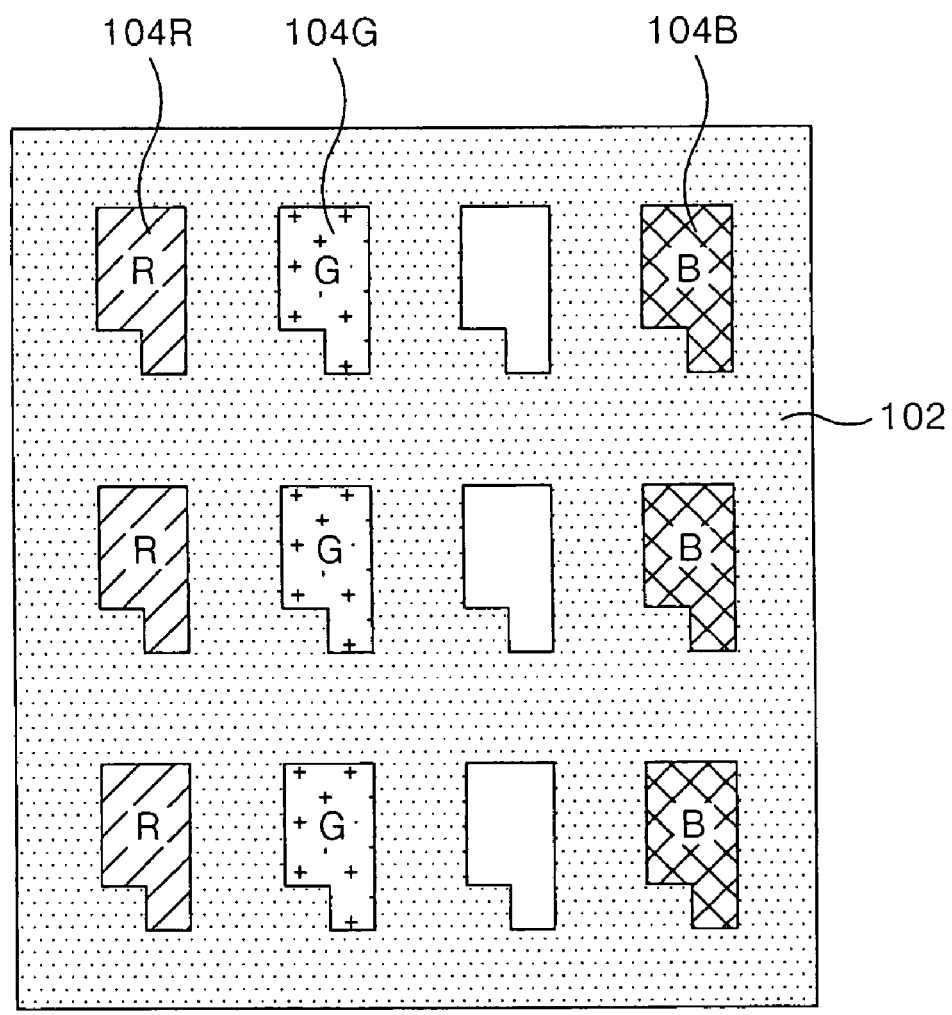
FIGS. 9A and 9B respectively are a planar view and a cross-sectional view illustrating a fourth mask process following the fabricating method of the color array substrate shown in FIGS. 8A and 8B.
Figure 9B:
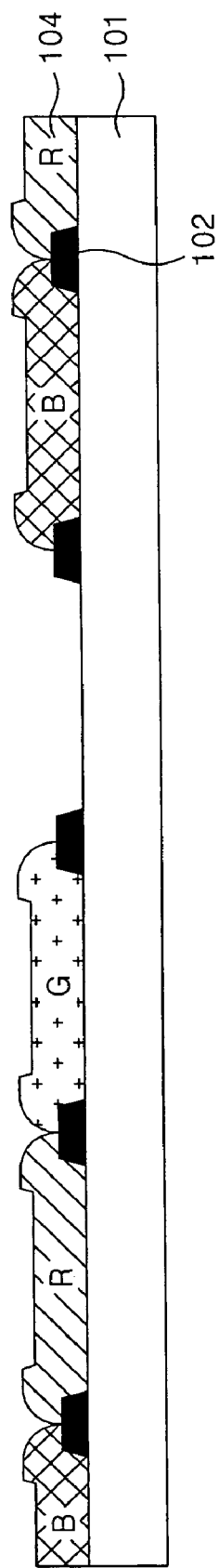

FIGS. 9A and 9B respectively are a planar view and a cross-sectional view illustrating a fourth mask process following the fabricating method of the color array substrate shown in FIGS. 8A and 8B. As shown in FIGS. 9A and 9B, a blue resin may be deposited on the entire surface of the substrate 101 above the black matrix 102, the red color filter 104R and the green color filter 104G. The blue resin then is patterned by the photolithography process using a fourth mask (not shown) to form a blue color filter 104B.

Figure 10A:
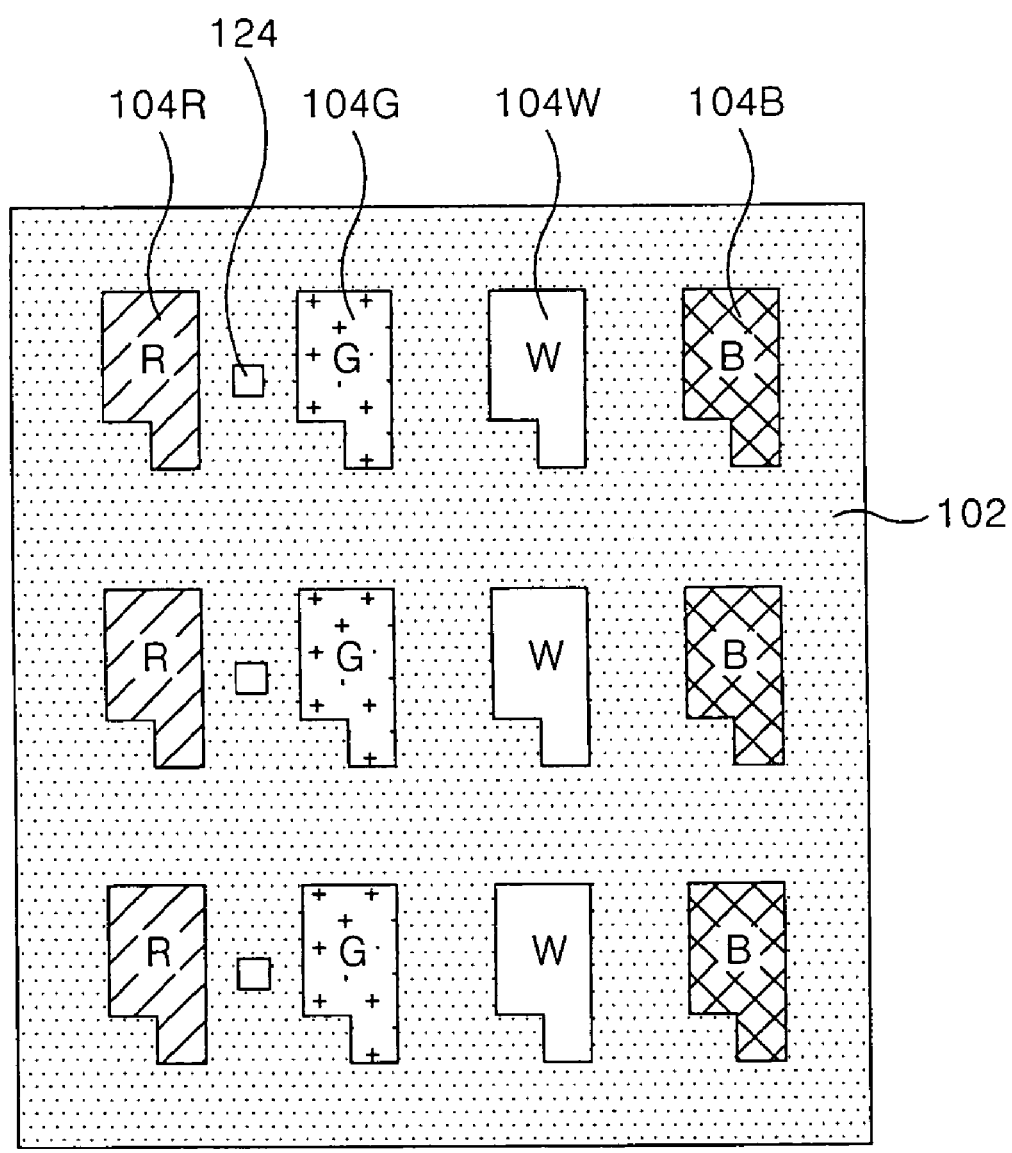
FIGS. 10A and 10B respectively are a planar view and a cross-sectional view illustrating a fifth mask process following the fabricating method of the color array substrate shown in FIGS. 9A and 9B.
Figure 10B:
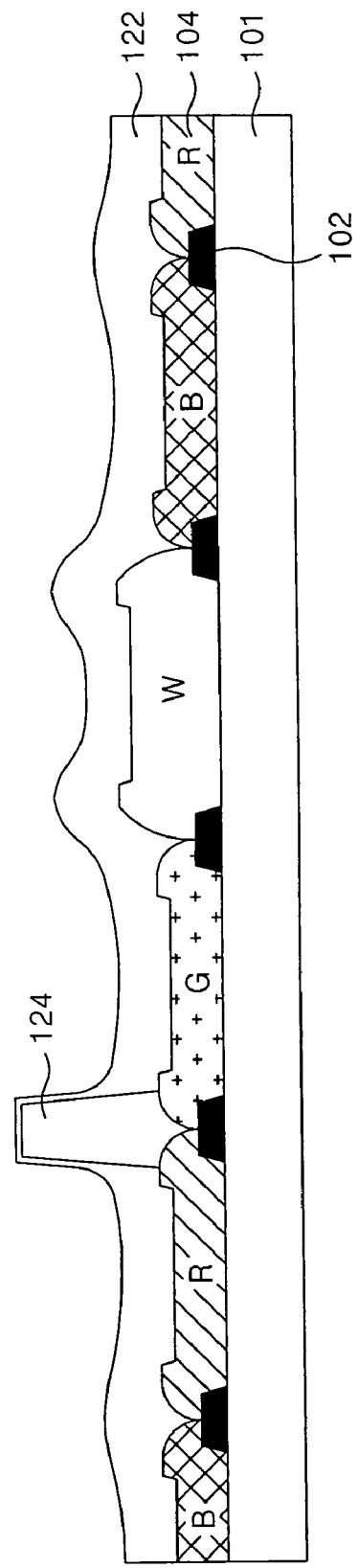

FIGS. 10A and 10B respectively are a planar view and a cross-sectional view illustrating a fifth mask process following the fabricating method of the color array substrate shown in FIGS. 9A and 9B. In FIGS. 10A and 10B, a white resin may be deposited on the entire surface of the substrate 101 above the black matrix 102, the red color filter 104R, the green color filter 104G and the blue color filter 104B. The white resin then is patterned by the photolithography process using a fifth mask (not shown) to form a white color filter 104W and a spacer 124 at the same time. The white resin may include acrylic resin.

In addition, an organic insulating material may be deposited on the entire surface of the substrate 101 over the black matrix 102, the red color filter 104R, the green color filter 104G, the blue color filter 104B, the white color filter 104W and the spacer 124. In particular, the organic insulating material may include the same material as the white resin 104W. The organic insulating material then is patterned by the photolithography process using a sixth mask (not shown) to form a overcoat layer 122. More specifically, the overcoat layer 122 is formed at a picture display area of the substrate 101 that is inside a sealant and a non-display area. Alternatively, the organic insulating material may be selectively coated on the substrate 101 at the picture display area without using the photolithography process and a sixth mask, thereby further reducing the number of mask processes.

FIGS. 6B, 7B, 8B, 9B, and 10B are not shown as exact cross-sectional views of FIGS. 6A, 7A, 8A, 9A and 10A. FIGS. 6A, 7A, 8A, 9A and 10A more closely illustrate the color filter array substrate shown in FIG. 4, and FIGS. 6B, 7B, 8B, 9B, and 10B more closely illustrate the color filter array substrate shown in FIG. 5. Further, although FIGS. 7A–9B illustrate forming the red color filter 104R first, then forming the green color filter 104G and forming the blue color filter 104B, it will be apparent to those skilled in the art that the red, green and blue color filters 104R, 104G and 104B may be formed in different orders.

Accordingly, the fabricating method of a color filter array substrate of the liquid crystal display panel according to an embodiment of the present invention forms the white color filter 104W and the spacer 124 in one photolithography process using a same mask. Thus, the number of mask processes is reduced and a fabrication cost is lowered without deteriorating transmissivity of the white color filter 104W.

FIG. 11 is a planar view illustrate a color filter array substrate for a liquid crystal display panel according to another embodiment of the present invention. In FIG. 11, a color filter array substrate for a liquid crystal display panel includes a black matrix 102, a plurality of color filters 104, an overcoat layer 122 and a spacer 124 formed on a substrate 101. The color filters 104 are formed corresponding to a plurality of cell areas of the liquid crystal display panel. Each of the color filters 104 may be one of red, green, blue and white color filters R, G, B and W.

In addition, the black matrix 102 is around the color filters 104 to prevent light interference from occurring between adjacent cells. In particular, a portion of the color filters 104 may overlap the black matrix 102, the color filters 104 may contact one another, and the height of the color filters 104 corresponding to the red, green and blue color filters R, G, and B may be the same. Although not shown, the black matrix 102 may overlap an area except a pixel electrode of a corresponding TFT array substrate. For instance, the black matrix 102 may overlap a gate line, a data line and a thin film transistor of the TFT array substrate.

Further, the overcoat layer 122 may include a transparent organic insulating material. In particular, the color filter 104 corresponding to the white color filter W may be a part of the overcoat layer 122. More specifically, the color filter 104 corresponding to the white color filter W and the overcoat layer may be formed at the same time and may have the same height without affecting the transmissivity of the color filter 104 corresponding to the white color filter W. As a result, the overcoat layer 122 provides a flat surface on the substrate 101 over the color filters 104 corresponding the red, green, blue and white color filters R, G, B and W.

Moreover, the spacer 124 is on the overcoat layer 122. The spacer 124 functions to maintain a cell gap between the color filter array substrate and the corresponding TFT array substrate. The spacer 124 is formed to overlap the black matrix 102. The spacer 124 may have various cross-sectional shapes, e.g., circular, rectangular and triangular or the like. Further, the spacer 124 may be columnar, concave, trapezoidal or the like.

As a result, the color filter array substrate of the liquid crystal display panel according to an embodiment of the present invention includes the color filter 104 corresponding to the white color filter W is a part of the overcoat layer 122. The color filter 104 corresponding to the white color filter W and the overcoat layer 122 are simultaneously formed of the same material. Accordingly, the number of mask processes is reduced without deteriorating the transmissivity of the color filter 104 corresponding to the white color filter W.

Figure 12A:
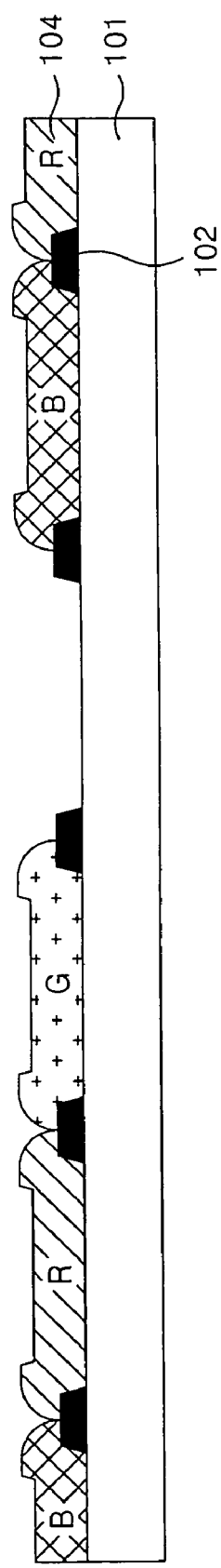
FIGS. 12A to 12C are cross-sectional views illustrating a fabricating method of a color array substrate according to another embodiment of the present invention.
Figure 12B:
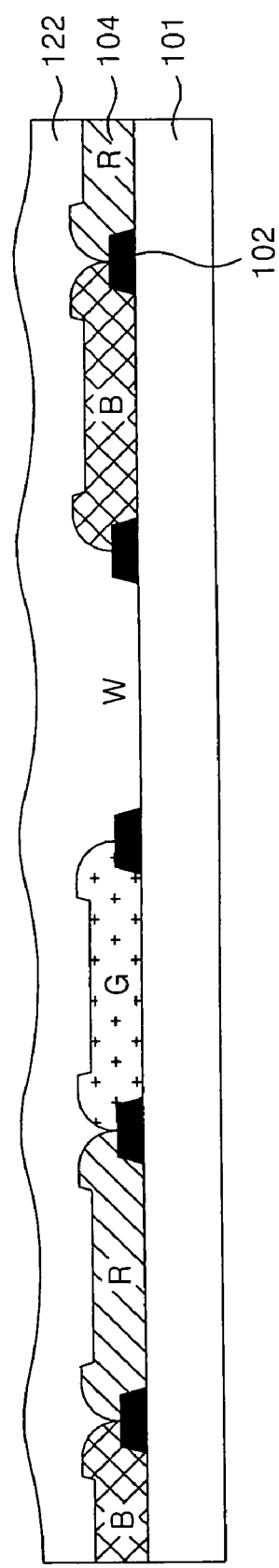
Figure 12C:
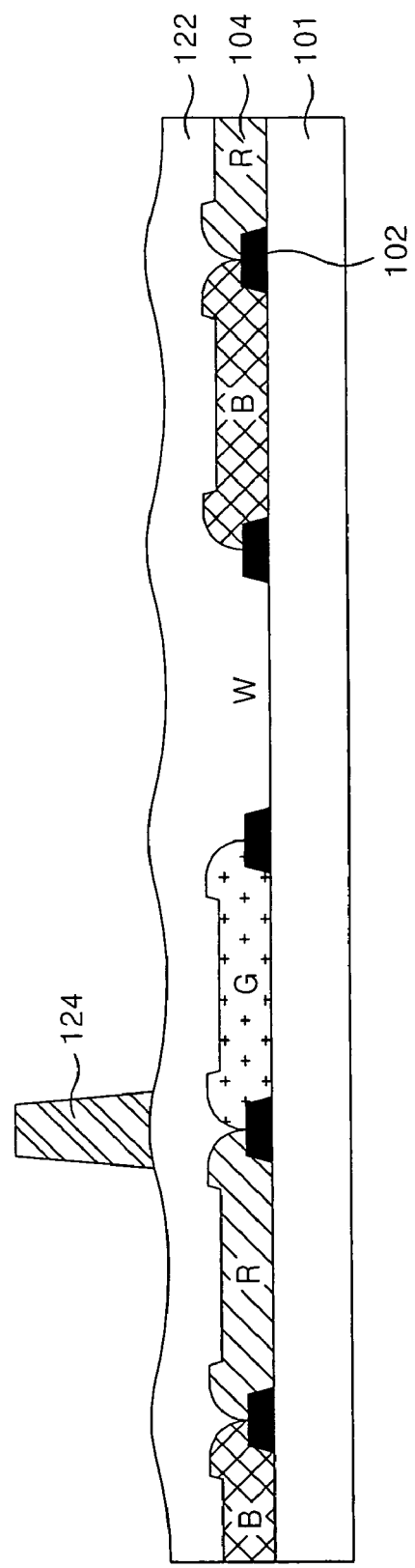

FIGS. 12A to 12C are cross-sectional views illustrating a fabricating method of a color array substrate according to another embodiment of the present invention. As shown in FIG. 12A, an opaque material may be deposited on a substrate 101 and may be patterned by a photolithography process using a first mask (not shown) to form a black matrix 102. Then, color resins may be deposited on the substrate over the black matrix 102 and may be patterned by photolithography processes using second to fourth masks (not shown) to form color filters 104 corresponding to red, green and blue color filters R, G, and B.

In addition, as shown in FIG. 12B, a white resin may be deposited on the substrate 101 over the black matrix 102 and the color filters 104 corresponding to the red, green and blue color filters R, G, and B to form a color filter 104 corresponding to a white color filter W and an overcoat layer 122. Thus, the portion of the white resin at a white sub-pixel area functions as the color filter 104 corresponding to the white color filter W. The white resin may be patterned by the photolithography process using a fifth mask (not shown), such that the overcoat layer 122 is formed at a picture display area of the substrate 101 that is inside a sealant and a non-display area. Alternatively, the white resin may be selectively coated on the substrate 101 at the picture display area without using the photolithography process and a fifth mask, thereby further reducing the number of mask processes.

Further, as shown in FIG. 12C, an organic insulating material may be deposited on the substrate 101 over the black matrix 102, the color filters 104 corresponding to the red, green, blue and white color filters R, G, B and W, and the overcoat layer 122. The organic insulating material then may be patterned by the photolithography process using a sixth mask (not shown) to form a spacer 124.

Accordingly, the fabricating method of a color filter array substrate of the liquid crystal display panel according to an embodiment of the present invention forms the color filter 104 corresponding to the white color filter W and the overcoat layer 122 in one photolithography process using a same mask. Thus, the number of mask processes is reduced and a fabrication cost is lowered without deteriorating transmissivity of the color filter 104 corresponding to the white color filter W. In addition, the overcoat layer 122 provides a more flat substrate surface for the color filter array substrate.

Figure 13:
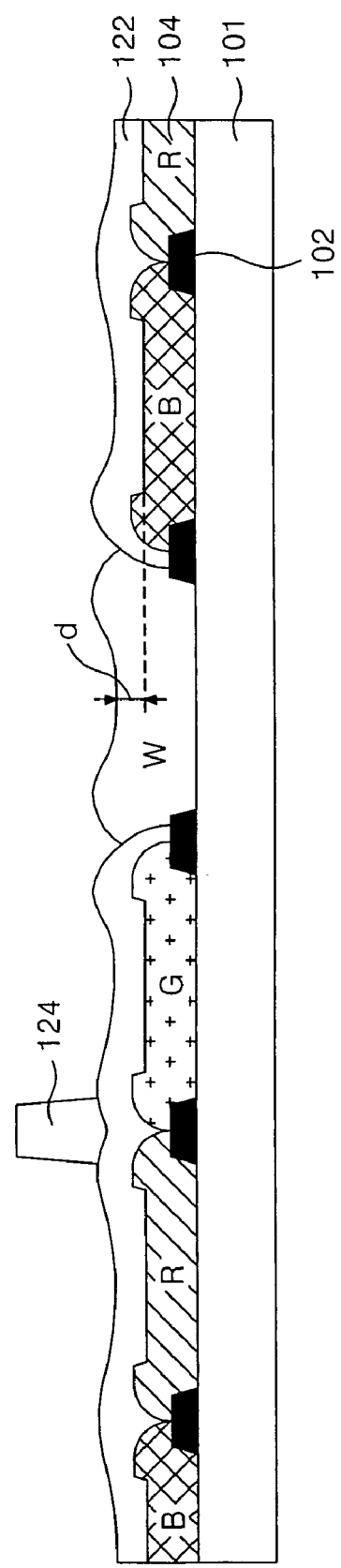
FIG. 13 is a cross-sectional view illustrating a color filter array substrate for a liquid crystal display panel according to another embodiment of the present invention.
Figure 14:
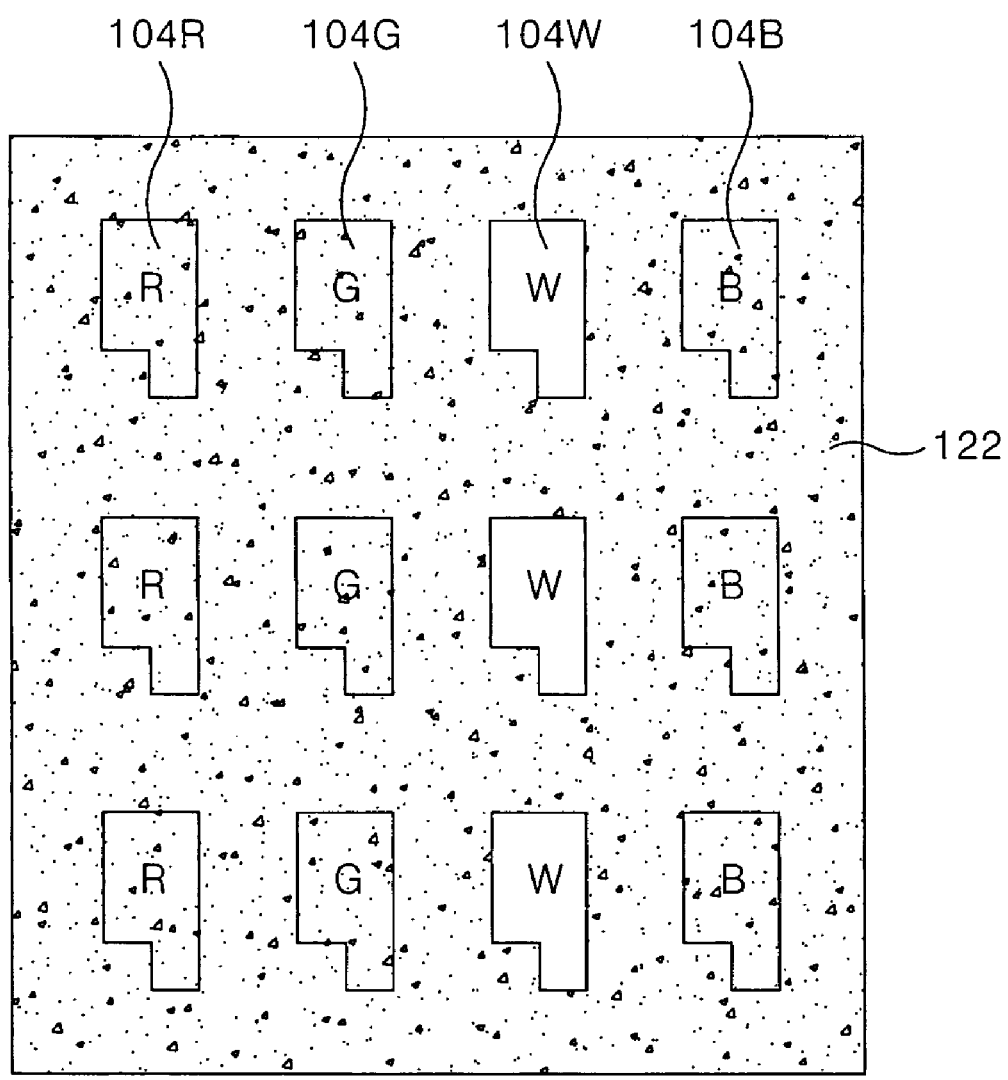
FIG. 14 is a planar view illustrating an overcoat layer of the color filter array substrate shown in FIG. 13.

FIG. 13 is a cross-sectional view illustrating a color filter array substrate for a liquid crystal display panel according to another embodiment of the present invention, and FIG. 14 is a planar view illustrating an overcoat layer of the color filter array substrate shown in FIG. 13. In FIG. 13, a color filter array substrate for a liquid crystal display panel includes a black matrix 102, a plurality of color filters 104, an overcoat layer 122 and a spacer 124 formed on a substrate 101. The color filters 104 are formed corresponding to a plurality of cell areas of the liquid crystal display panel. Each of the color filters 104 may be one of red, green, blue and white color filters R, G, B and W.

In addition, the black matrix 102 is around the color filters 104 to prevent light interference from occurring between adjacent cells. In particular, a portion of the color filters 104 may overlap the black matrix 102, and the height of the color filters 104 corresponding to the red, green and blue color filters R, G, and B may be the same. The color filters 104 corresponding to the red, green and blue color filters R, G, and B may contact one another. Although not shown, the black matrix 102 may overlap an area except a pixel electrode of a corresponding TFT array substrate. For instance, the black matrix 102 may overlap a gate line, a data line and a thin film transistor of the TFT array substrate.

Further, the overcoat layer 122 may include a transparent organic insulating material. In particular, as shown in FIG. 14, the overcoat layer 122 is formed at a picture display area except for an area where the white color filter 104W. For instance, the overcoat layer 122 may be formed is inside a sealant and a non-display area and may not overlap a white sub-pixel area of the substrate 101.

Moreover, as shown in FIG. 13, the spacer 124 may be formed simultaneously as the color filter 104 corresponding to the white color filter W. As a result, the color filter 104 corresponding to the white color filter W and the spacer 124 may have the same height and may include the same material that does not affect the transmissivity of the color filter 104 corresponding to the white color filter W. The color filter 104 corresponding to the white color filter W may overlap a portion of the overcoat layer 122 and the black matrix 102.

The color filter 104 corresponding to the white color filter W may have a height larger than the height of the color filters 104 corresponding to the red, green and blue color filters R, G and B, but is substantially level to the overcoat layer 122. For example, the height of the color filter 104 corresponding to the white color filter W may be greater than the height of the color filter 104 corresponding to the blue color filter B by a height different of d. The height difference d preferably is below about 0.2 µm.

Thus, the overcoat layer 122 compensates the height difference between pixel areas. For instance, the height of the color filter 104 corresponding to the red, green and blue color filters R, G and B may be about 2.x µm ($2 \leq 2.x < 3$), and the height of the overcoat layer 122 may be about 1.x µm ($1 \leq 1.x < 2$). Then, the area where the color filter 104 corresponding to the white color filter W has a height difference of abut 3.x µm ($3 \leq 3.x < 4$) comparing to the area where the color filter 104 corresponding to the red, green and blue color filters R, G and B. Accordingly, the color filter 104 corresponding to the white color filter W and the spacer 124 may be formed to have a height of about 3.x µm ($3 \leq 3.x < 4$). As a result, the height difference between the pixel areas where the color filter 104 corresponding to the red, green, blue and white color filters R, G, B and W is compensated. Further, the height of the spacer and the overcoat layer is controlled in accordance with the cell gap, thereby adjusting the cell gap.

Further, the spacer 124 is formed on the overcoat layer 122 above the black matrix 102. The spacer 124 functions to maintain a cell gap between the color filter array substrate and the corresponding TFT array substrate. The spacer 124 may have various cross-sectional shapes, e.g., circular, rectangular and triangular or the like. Further, the spacer 124 may be columnar, concave, trapezoidal or the like.

As a result, the color filter array substrate of the liquid crystal display panel according to an embodiment of the present invention includes the color filter 104 corresponding to the white color filter W and the spacer 124 simultaneously formed of the same material. Accordingly, the number of mask processes is reduced without deteriorating the transmissivity of the color filter 104 corresponding to the white color filter W. In addition, the overcoat layer 122 is formed at a display area except for an area where the color filter 104 corresponding to the white color filter W is to be formed, thereby compensating the height difference between the pixel areas.

Figure 15A:
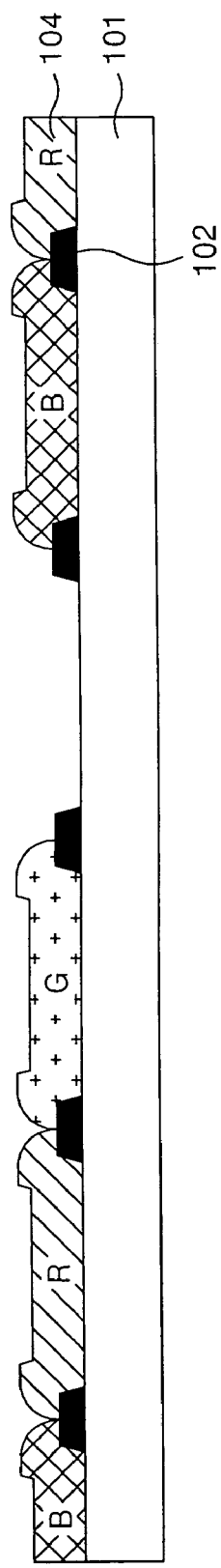
FIGS. 15A to 15C are sectional views illustrating a fabricating method of a color array substrate according to another embodiment of the present invention.
Figure 15B:
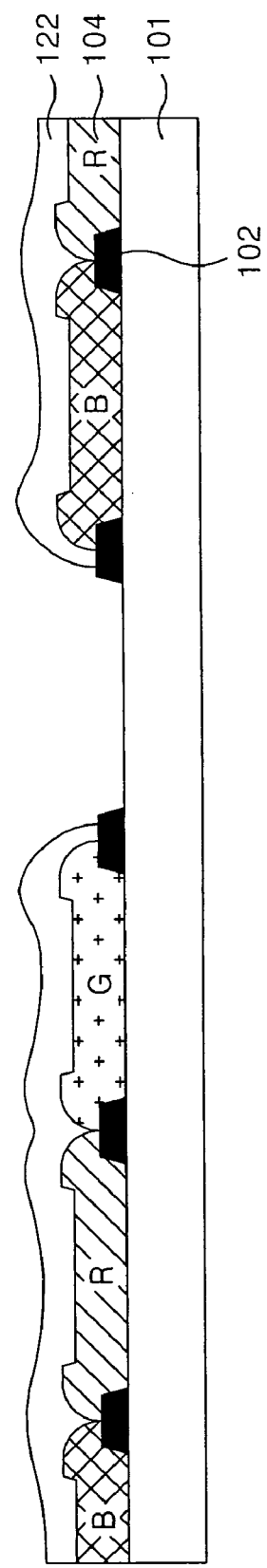
Figure 15C:
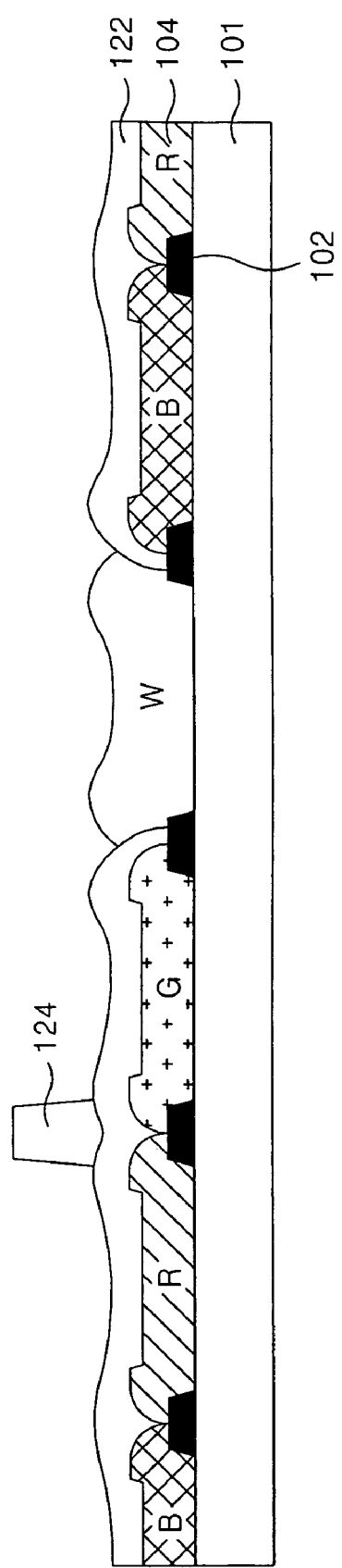

FIGS. 15A to 15C are sectional views illustrating a fabricating method of a color array substrate according to another embodiment of the present invention. As shown in FIG. 15A, an opaque material may be deposited on a substrate 101 and may be patterned by a photolithography process using a first mask (not shown) to form a black matrix 102. Then, color resins may be deposited on the substrate over the black matrix 102 and may be patterned by photolithography processes using second to fourth masks (not shown) to form color filters 104 corresponding to red, green and blue color filters R, G, and B.

In addition, as shown in FIG. 15B, an organic insulating material that is photo-sensitive, e.g., acrylic resin, may be deposited on the substrate 101 over the black matrix 102, and the color filters 104 corresponding to the red, green, and blue color filters R, G and B. The organic insulating material then may be patterned by the photolithography process using a fifth mask (not shown) to form an overcoat layer 122. In particular, the overcoat layer 122 is patterned to be at a picture display area of the substrate 101 that is inside a sealant and does not overlap a white sub-pixel area of the substrate 101.

Further, as shown in FIG. 15C, a white resin may be deposited on the substrate 101 over the black matrix 102, the color filters 104 corresponding to the red, green and blue color filters R, G, and B and the overcoat layer 122. The white resin may include acrylic resin. The white resin then may be patterned by the photolithography process using a sixth mask (not shown) to form a color filter 104 corresponding to a white color filter W and a spacer 124. Thus, the color filter 104 corresponding to the white color filter W and the spacer 124 may have the same height and may include the same material that does not affect the transmissivity of the color filter 104 corresponding to the white color filter W. The color filter 104 corresponding to the white color filter W may overlap a portion of the overcoat layer 122 and the black matrix 102.

Accordingly, the fabricating method of a color filter array substrate of the liquid crystal display panel according to an embodiment of the present invention forms the overcoat layer 122 before forming the color filter 104 corresponding to the white color filter W. In addition, the color filter 104 corresponding to the white color filter W and the overcoat layer 122 may be formed in one photolithography process using a same mask. Thus, the number of mask processes is reduced and a fabrication cost is lowered without deteriorating transmissivity of the white color filter. In addition, the height of the color filter 104 corresponding to the white color filter W may be controlled to be level to the overcoat layer 122, thereby providing a more flat substrate surface for the color filter array substrate.

FIGS. 4–15C illustrate the embodiments for an IPS mode liquid crystal display panel having a common electrode and the pixel electrode formed on a corresponding TFT array substrate for applying a horizontal electric field. Although not shown, the above-described embodiments of the present invention may be modified for a TN mode liquid crystal display panel having a common electrode formed on the color filter array substrate for applying a vertical electric field with a pixel electrode formed on a corresponding TFT array substrate.

The color filter array substrate and a fabricating method thereof according to the above-described embodiments of the present invention forms the white color filter at the same time as the spacer or the overcoat layer. Accordingly, the color filter array substrate may be formed using six or five mask processes, thereby simplifying its structure and fabricating process. Thus, a production yield is improved and a production cost is reduced. In addition, the heights of the white color filter, the overcoat layer and the spacer may be controlled to provide a more flat substrate surface for the color filter array substrate and to adjust a cell gap, thereby improving image quality of the resultant liquid crystal display panel.

It will be apparent to those skilled in the art that various modifications and variations can be made in the color filter array substrate and the fabricating method thereof of the present invention without departing from the sprit or scope of the invention. Thus, it is intended that the present invention covers the modifications and variations of this invention provided they come within the scope of the appended claims and their equivalents.

What is claimed is:

1. A color filter array substrate, comprising:
   a black matrix on a substrate;

a plurality of color filters at an area separated by the black matrix, the color filters including red, green, blue and white color filters, a height of the white color filter being different from a height of the red, green and blue color filters; and a spacer at an area that overlaps the black matrix, wherein the white color filter and the spacer include the same material.

2. The color filter array substrate according to claim 1, further comprising:

an overcoat layer on the substrate where the red, green, blue and white color filters and the spacer are formed.

3. The color filter array substrate according to claim 1, wherein the white color filter includes an organic insulating material having acrylic resin.

4. The color filter array substrate according to claim 1, further comprising:

an overcoat on the substrate; and a common electrode on the substrate where the overcoat layer is formed.

5. A color filter array substrate, comprising:

a black matrix on a substrate;

a plurality of color filters at an area separated by the black matrix, the color filters including red, green, blue and white color filters, a height of the white color filter being different from a height of the red, green and blue color filters;

an overcoat layer integrally formed with the white color filter using the same material and being formed at the same time as the forming of the white color filter; and a spacer on the overcoat at an area that overlaps the black matrix, wherein the height of the white color filter is larger than the height of the red, green and blue color filters.

6. A color filter array substrate, comprising:

a black matrix on a substrate;

a plurality of color filters at an area separated by the black matrix, the color filters including red, green, blue and white color filters, a height of the white color filter being different from a height of the red, green and blue color filters;

an overcoat layer on the substrate over the color filters except for the white color filter; and a spacer on the overcoat at an area that overlaps the black matrix.

7. The color filter array substrate according to claim 6, wherein the white color filter and the spacer include the same material.

8. The color filter array substrate according to claim 6, wherein the spacer formed at the same time as the forming of the white color filter.

9. The color filter array substrate according to claim 6, wherein the height of the white color filter is the same as a height of the spacer.

10. A fabricating method of a color filter array substrate, comprising:

forming a black matrix on a substrate;

forming red, green and blue color filters at an area separated by the black matrix except for white color filter, forming an overcoat layer over the red, green and blue color filters;

forming an white color filter at an area separated by the black matrix; and forming a spacer at an area that overlaps the black matrix, wherein a height of the white color filter being different from a height of the red, green and blue color filters.

11. The fabricating method according to claim 10, wherein the white color filter has the same height as the spacer.

12. The fabricating method according to claim 10, wherein the white color filter is formed at about the same time as the spacer is formed.

13. The fabricating method according to claim 10, wherein the white color filter and the spacer are formed of the same material.

14. The fabricating method according to claim 10, wherein the white color filter is formed of an organic insulating material having acrylic resin.

15. The fabricating method according to claim 10, further comprising:

forming a common electrode on the substrate where the overcoat layer is formed.

16. A fabricating method of a color filter array substrate, comprising:

forming a black matrix on a substrate;

forming red, green, blue and white color filters at an area separated by the black matrix, a height of the white color filter being different from a height of the red, green and blue color filters;

forming a spacer at an area that overlaps the black matrix; and forming an overcoat layer on the substrate where the red, green, blue and white color filters and the spacer are formed, wherein the white color filter and the spacer include the same material.

17. The fabricating method according to claim 16, wherein the white color filter is formed at about the same time as the spacer is formed.

18. A fabricating method of a color filter array substrate, comprising:

forming a black matrix on a substrate;

forming red, green, blue and white color filters at an area separated by the black matrix; and forming an overcoat layer over at least the red, green, and blue color filters, wherein the white color filter is simultaneously formed as a spacer is formed on the overcoat when the overcoat layer is formed before the forming of the white color filter.

* * * * *